United States Patent [19]
Ellis

[11] 3,851,242
[45] Nov. 26, 1974

[54] FREQUENCY-MODULATED EDDY-CURRENT PROXIMITY GAGE

[76] Inventor: James F. Ellis, R.F.D. 2, Box 248, Powell, Tenn. 37849

[22] Filed: June 27, 1972

[21] Appl. No.: 266,670

[52] U.S. Cl. .................. 324/40, 324/34 PS, 331/65
[51] Int. Cl. ............................................ G01r 33/00
[58] Field of Search .......... 324/34 R, 34 TK, 34 PS, 324/34 D, 37, 40, 61 S; 331/65; 340/258 C, 258 R

[56] References Cited
UNITED STATES PATENTS

| | | | |
|---|---|---|---|
| 2,581,394 | 1/1952 | Dinger | 324/34 TK |
| 2,686,039 | 8/1954 | Bender | 324/34 R |
| 3,400,331 | 9/1968 | Harris | 324/61 S |

Primary Examiner—Robert J. Corcoran

[57] ABSTRACT

This invention is an improvement in a non-contact proximity gage suitable for detecting and/or making dimensional measurements relative to an electrically conducting surface by means of eddy currents that shift the frequency of a stabilized oscillator self-contained in the measuring transducer. Connection to remote processing instrumentation is made by means of a single coaxial cable which serves both as a direct-current input and an alternating-current output of the transducer. Both digital and analog means are provided for processing the output of the transducer. The entire system is based upon the modulation and detection of frequency rather than amplitude or phase angle.

4 Claims, 7 Drawing Figures

PATENTED NOV 26 1974　　　　　　　　　　　3,851,242

FREQUENCY-MODULATED EDDY-CURRENT PROXIMITY GAGE

The invention described herein was made in the course of, or under, a contract with the U.S. Atomic Energy Commission.

FIELD OF THE INVENTION

My invention relates to devices for detecting conducting surfaces and/or making dimensional measurements related thereto. More particularly, it relates to those devices functioning by means of eddy currents. Specifically, it relates to any device which makes a non-contact dimensional measurement by means of a shift or modulation of frequency that is induced by eddy currents.

BACKGROUND OF THE INVENTION

During recent years, the use of eddy currents for making non-contact dimensional measurements has increased rapidly. The scope of these measurements includes a variety of instruments ranging from simple object detectors used as counters on production lines to sophisticated analytical instruments for materials evaluation. Perhaps the best known techniques today are analog, and involve the use of fixed frequencies and the measurements of impedance changes, amplitudes, and phase angles. Less well known are those techniques that rely upon frequency shifts (modulation) as a measuring means.

The principles of prior art eddy-current gages have been thoroughly treated in the literature and will not be repeated herein. A few examples will be cited, however, in order to show the novelty of my invention.

Because of the rapidly increasing use of various types of transducers in modern technology, there are many applications for proximity-measuring devices both as sensing elements in transducers and as transducers themselves.

Dimensional gaging now being done with eddy currents by prior art analog techniques that involve measurements of amplitude and/or phase angle have certain outstanding limitations. These limitations arise partly from the fact that the transducer's active components are remotely located from its sensing elements and interconnected by wires. Such a device usually employs a high-frequency oscillator for exciting a sensing transducer as well as phase and amplitude sensing elements for processing the transducer's output. Phasing currents are often transmitted to a demodulator by wiring from the oscillator while the varying sensory signals arrive by way of a circuit through the sensing transducer. Because of the finite velocity of electrical signals in wires, the length of interconnecting cables and the frequency of the carrier current must be limited if the desired phase-angle relationships are to be maintained.

Since the variable quantities in these cases are amplitude and phase angle, slight variations in the propagation velocity of the carrier-current signals along the cables will result in the generation of false output signals at the demodulator. Such variations can arise from changing temperatures, causing the electrical properties of the interconnecting cables to change accordingly. If these effects are minimized by lowering the carrier-current frequency, the penetration depth of the eddy currents into the test surface is increased and the sensitivity of the device is decreased. Increased penetration depth causes increased errors when measuring small distances.

It can now be shown that the limitations imposed by the use of these analog methods could be overcome by using frequency and/or period as the measurable variables instead of phase and/or amplitude.

THE PRIOR ART

That eddy currents were being used for gaging and materials evaluation as early as the year 1925 (and perhaps even earlier) is shown by the work of Kranz (U.S. Pat. No. 1,815,717). In Kranz' invention, the electromagnetic properties of a test sample influenced the quality factor (Q) of an oscillator's resonant circuit and were measured by means of a meter connected in series with the plate of a vacuum tube. That these properties would also cause a shift in operating frequency is incidental.

Dinger (U.S. Pat. No. 2,581,394) later disclosed an eddy-current measuring device sensitive to frequency rather than amplitude or phase angle. Dinger's instrument, mechanically adapted for measuring nonconducting films, employed two oscillators whose outputs were mixed to provide a hetrodyne which could be detected by visual or aural means. The quantity measured was the change in capacitance required to bring the variable oscillator back to the reference frequency of the fixed oscillator after placing the sensing probe on a test sample. This quantity was then related to a physical dimension. Some limitations of this kind of instrument are:

1. Frequency shift (resulting from the measured quantity) is measured indirectly and requires manual "hunting."

2. There is "pulling" of the two oscillators when they are near the same frequency.

3. Because of the structure of this kind of instrument, the carrier frequency is best made well below one-megahertz for purposes of stability, resulting in significant penetration of the eddy currents into the conducting material and consequent errors when measuring thin samples.

4. The sensing coil and the active elements of the variable oscillator are contained separately and interconnected by a length of cable which is itself a source of error. Capacitance changes caused by flexure or temperature changes within the cable will result in frequency shifts not associated with the sample under test.

Chapman, Et. Al, (U.S. Pat. No. 3,022,451) disclosed an instrument suitable for the sorting of production parts by means of a predetermined shift in frequency produced by the insertion of a test part into a coil attached by wires to an oscillator. Semelman (U.S. Pat. No. 3,036,267) also disclosed an instrument suitable for measuring the permeability of samples by a somewhat similar method. While both of these types of instruments function by frequency shift, they are suitable primarily for the sorting of production parts rather than the precise measurement of minute displacements or spacings.

Some of the eddy-current devices that measure minute displacements and spacings by analog methods have employed elaborate compensation methods to overcome the effects of temperature and other variables associated with phase-angle and amplitude detection. The inventions of Krobath (U.S. Pat No.

3,252,084) and Petrini (U.S. Pat. No. 3,491,289) may be considered as examples of analog instruments using more elaborate and refined compensating means. Harmon (U.S. Pat. No. 3,497,799) has disclosed another analog-type eddy-current instrument (intended for flaw detection) which has a significant amount of compensating and control circuitry.

Because of the well-known "skin effect", high frequencies penetrate less deeply into conductors than low frequencies. The higher frequencies also provide a greater bandwidth and better dynamic response. As I have pointed out, an obvious way to reduce the dimensional error caused by penetration of eddy currents into test samples is to increase the carrier frequency. In so doing, delicate measurements involving phase-angle detection become more difficult. Because of the shortened wavelengths at higher frequencies, slight changes in wave propagation times within the cables resulting from thermal effects can upset critical phasing adjustments. As a result, one error is substituted for another. For this reason, increasing the carrier frequency may be expected to improve the accuracy and dynamic response of an instrument at the expense of stability. An example of an instrument especially adapted for very fast response in hostile environments is disclosed in my U.S. Pat. No. 3,609,527.

OBJECTIVE OF THE INVENTION

The objective of my invention is to provide a noncontact eddy-current gage for dimensional measurements offering the following improvements:

1. A reduction of the errors caused by eddy-current penetration of a test sample,
2. an increase in overall stability,
3. immunity to the effects of cable lengths and/or cable transmission losses,
4. simplicity of design,
5. compatibility with standard laboratory instruments, and
6. the choice of an analog, a coded, or a direct digital output with easy interfacing to a computer.

SUMMARY OF THE INVENTION

The instrument of my invention may be designed to operate at any carrier frequency from a few kilohertz to 100 megahertz or more. Proximity to a conducting surface is measured as a function of a shift in carrier frequency which is transmitted undistorted over any practical length of coaxial cable. Since frequency is the only variable of any importance, it is only necessary that an intelligible signal free from excessive noise be received at the readout station. The stability of the variable oscillator is greatly improved by making it an integral and self-contained part of the sensing transducer. By unique but simple circuitry, a single coaxial cable serves as both input and output for the transducer. Loading of the oscillator is very slight and stability is excellent.

By using a standard laboratory frequency counter as an output, the instrument may be read in digital form. One embodiment requires that a calibration chart or graph be used to convert the output to engineering units. When a computer is used for data storage and analysis, a linearizing equation may be incorporated into the computer program. Another embodiment provides a means to linearize a portion of the output range by means of a reference oscillator and hetrodyne. Other embodiments provide for a linearized analog output as an option.

DETAILED DESCRIPTION OF THE INVENTION

My invention may be thought of as being divided into three main parts which are: the sensing transducer, the power supply, and the readout circuitry. When conditions require it, an amplifier may be provided along the coaxial cable leading from the transducer. When the amplifier is used, it obtains its power from the same common coaxial cable used as both input and output of the transducer.

Figure 1:
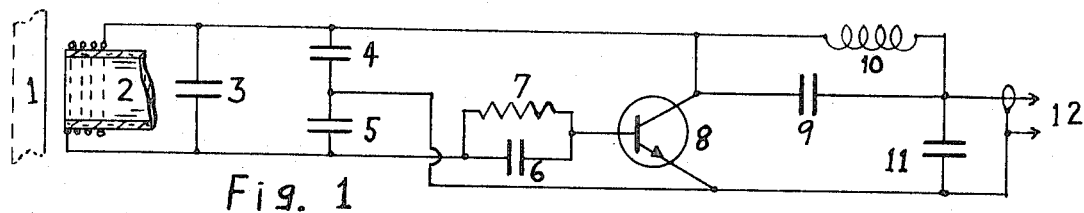
FIG. 1 is a schematic diagram of a typical transducer.

FIG. 1 of the drawing is a schematic diagram representing a typical embodiment of the sensing transducer. Items numbered consecutively 2 through 8 comprise the elements of an oscillator. A positive voltage applied to the center terminal of connector 12 by means of a coaxial cable is transmitted via the choke, 10, to the collector of transistor 8 and also via the sensing coil, 2, and the bias resistor, 7, to the base of the transistor thereby causing it to conduct and causing the circuit to oscillate at the resonant frequency of the tank circuit formed by coil 2 and capacitors 3, 4, and 5. The value of capacitor 9 as well as the capacitance of transistor 8 are very small compared to that of the tank circuit and are therefore insignificant for practical purposes of calculating the oscillator's frequency.

Capacitor 3 provides the main portion of the tank capacitance while the combined function of capacitors 4 and 5 is that of a high-frequency bridge providing coupling capacitor 6 and the base of transistor 8 with a voltage opposite in phase to that of the collector, thus sustaining oscillation.

Neglecting the effects of resistance, the resonant frequency of an inductance capacitance (LC) oscillator may be expressed by the relationship:

$$F = 1/2\pi \sqrt{LC}$$

where $F$ represents the frequency in hertz, $L$ is the inductance in henrys, and $C$ is the capacitance in farads. Frequency is obviously the reciprocal of period.

Referring again to FIG. 1: When the electrically conductive surface, 1, involved in the measured dimension is brought near the annular coil, 2, it causes a bucking of the electromagnetic field because of the induced eddy currents and thus decreases the coil's inductance which in turn increases the oscillator's frequency. It then follows that, for a given set of parameters, the spacing between the annular coil and the electrically conducting surface may be read in terms of either the frequency or period of the transducer's oscillator.

To realize the full capabilities of the device, considerable care is given to the selection of components and to the physical construction of the transducer to insure maximum stability. Even with the use of the best of components and construction practices, the transducer will still retain some small temperature coefficient. The small capacitor, 9, is therefore made to serve in a dual role of output coupler and temperature compensation. Capacitors 9 and 11 act as a bridge which allows only a very small amount of the oscillator's energy to go back into the coaxial connector 12. To maximize the sensitivity of the transducer, its annular sensing coil is made as short as possible in relation to its diameter. This causes the inductance of the coil to be quite sensitive to any change in diameter. For this reason, I prefer to construct the coil of a single layer of silver or copper winding bonded to a form of fused quartz or ceramic for the larger coils, and premium grade ferrites for the smaller ones. Using these and other techniques, oscillators having drift rates below one part in ten-million per hour in controlled environments have been built.

While the use of separate conductors for both the input and output of the transducer is within the scope of my invention, I prefer to use a single coaxial conductor. It is apparent that the basic concept shown in FIG. 1 can be modified in several ways, for example, the choke, 10, can be eliminated and the center terminal of connector 12 can be tied to a center tap made to coil 2 or, choke 10 may be replaced by a suitable resistor. Where a very small transducer is required, an oscillator may be constructed using only a tunnel diode and a coil. While a tunnel diode oscillator does not provide the stability of the former type, it can be built into a very small diameter owing to the elimination of the bulky capacitors. The period of such an arrangement is then determined by the inductance of the coil and the resistance characteristic of the diode. Handbooks and other literature will show several oscillator circuits that can be adapted to these applications.

Figure 2:
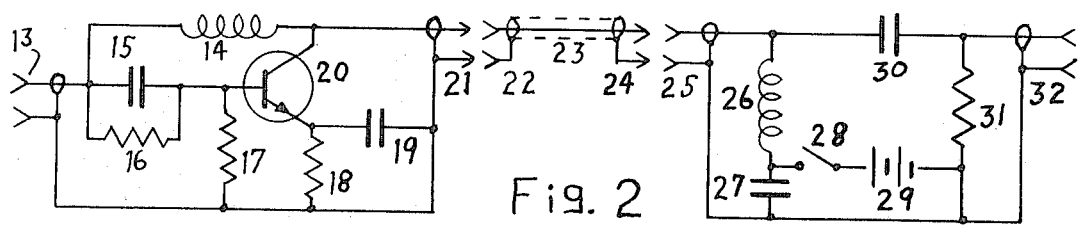
FIG. 2 is a typical arrangement of an amplifier and a power supply.

FIG. 2 illustrates typical circuitry which is used in conjunction with the transducer. Items numbered consecutively 13 through 21 represent a simple amplifier which may either be used or omitted. Connector 12 of the transducer (FIG. 1) is mated with connector 13 of the amplifier either directly or by coaxial cable. Direct current is provided at connector 21 and delivered to connector 13 via choke 14. Signal (alternating) current is passed from 13 to the base of transistor 20 via capacitor 15 while resistors 16, 17, and 18 bias the transistor, and capacitor 19 grounds the emitter to high frequencies. Resistor 17 also serves as a terminal load for the amplifier's input. Amplified signals at the transistor's collector are direct coupled to the output.

Item 23 represents a length of coaxial cable that may be used between the transducer and amplifier, or between amplifier and power supply when direct connection is not made. Items 22 and 24 are input and output connectors.

Items 25 through 32 show a typical embodiment of the power supply. Because of the very low power requirement, batteries are used. A regulated d-c supply operating from utility power can also be used. Connector 25 can be mated with connector 12 of FIG. 1 directly or by use of the amplifier and cables. Direct current from battery 29 appears at connector 25 via switch 28 and choke 26 while signals are passed from connector 25 to the output connector 32 via capacitor 30. Capacitor 27 is a high frequency bypass and resistor 31 is a terminating load. By any suitable combination of these circuits, a sample of the transducer's frequency appears at connector 32.

Figure 3:
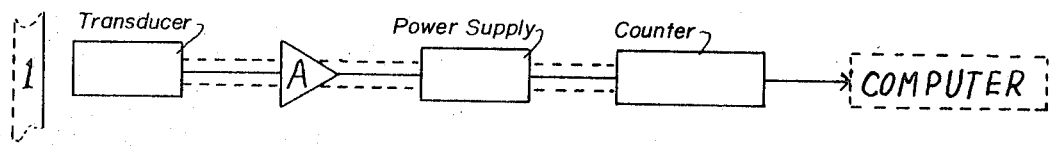
FIG. 3 shows a direct digital embodiment employing a computer.

FIG. 3 is a block diagram of a typical embodiment of the invention. The transducer operates as previously explained. Proximity of the object 1 alters the frequency of the transducer which produces as output that is in turn amplified by amplifier A and passed on to the digital counting unit, COUNTER, and thence to the computer which is not a part of the invention. Electrical energy from the power supply is transmitted back through the amplifier A to energize the transducer. The digital counting unit is gated on by its internal timebase and allowed to count for a preset length of time, after which, it is gated off and the accumulated number is either displayed or put into the computer by any suitable code, or both. Since the frequency of the transducer changes as a nonlinear function of separation, the number displayed by the counter must be converted to dimensional units by means of a calibration table or graph. The computer, on the other hand, may be programmed to present the data as a linearized function directly in dimensional engineering units. It is apparent that several transducers may be multiplexed to a single computer by a suitable scanning arrangement.

The relationship between the interaction of the transducer's sensing coil and its distance from an electrically conducting surface follows a somewhat complex function. For reasons of practicality, the following analysis is based on generalities and approximations:

It is assumed that the coil's effective inductance increases asymptotically with increasing distance within certain general limits. It is also assumed that an electrically conducting surface is a perfect reflector of the electromagnetic waves produced by the transducer's coil and that the "mirror image" of the coil's field appears to that field as if it were a separate entity. It is further assumed that Coulomb's experimental findings regarding the interaction between two poles of separate magnets also holds for the interaction of the coil's field with its mirror image. Making these assumptions, it follows that the rate of change of the coil's effective inductance will vary inversely as the square of the separation distance between the coil and the surface.

Figure 7:
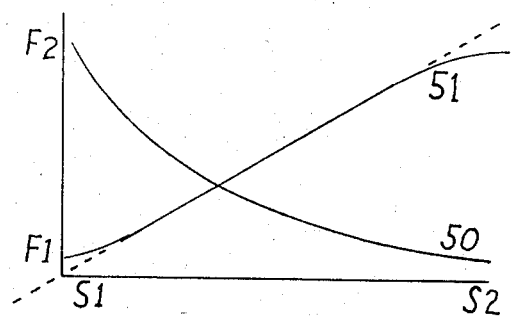
FIG. 7 is a graph illustrating the appearance of a typical linearized output compared to the un-linearized frequency shift of the sensing transducer.

Line 50 of the graph (FIG. 7) shows the transducer's output frequency as a function of its separation from a conducting surface. Separation is plotted along the abscissa and frequency along the ordinate. As the separation increases from a minimum, S1, to a maximum, S2, the frequency decreases from a maximum, F2, to a minimum, F1. The frequency of the transducer does not go to zero at any point but decreases asymptotically. In free space, it may be as much as 75 percent as high as that produced at minimum separation.

If the assumption is true that (for a limited range) the rate of change of the inductance varies inversely as the square of the spacing, then remembering that the period of an IC oscillator varies as the square root of its inductance, it appears that some linear relationship should exist between the period and the spacing by reason of the combining of the square term with the square root term.

Figure 4:
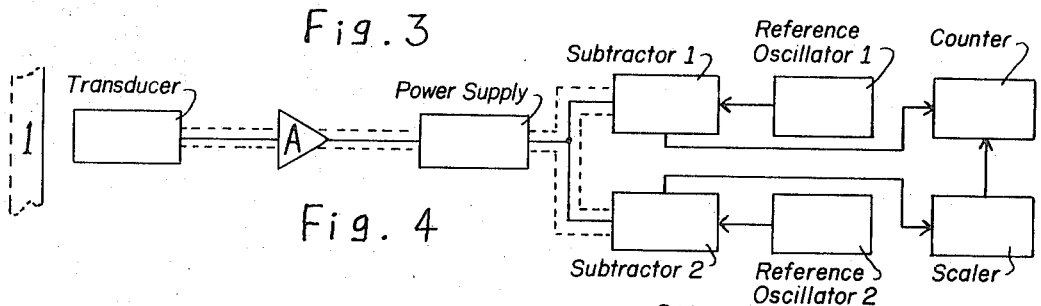
FIG. 4 outlines an arrangement for linearizing a direct digital output.

FIG. 4 is a block diagram of an embodiment which, according to my experiments, provides a linearizing means based upon the aforesaid generalities. As in the previously described embodiments, the surface of a conducting object, 1, causes the output frequency of the transducer to shift. The transducer's output is amplified by amplifier, A, and power is provided by the power supply. The remaining blocks may be considered as the readout circuitry. The first reference frequency oscillator, REFERENCE OSCILLATOR 1, produces an output frequency which is equal to the frequency of the transducer when the spacing of the surface and the coil is at an arbitrary zero position. The second reference frequency oscillator, REFERENCE OSCILLATOR 2, is tuned to that frequency which the transducer would produce if the conducting surface were separated from the coil by a distance of infinity. The output of REFERENCE OSCILLATOR 1 is injected into subtractor 1 which produces an output whose frequency is the the difference between that of the transducer and REFERENCE OSCILLATOR 1. This difference frequency is then counted by the digital counter. Subtractor 2 likewise produces an output which is the difference between the frequencies of the transducer and RF2. The time base scaler is a digital scaler which produces one output pulse for a given number of input pulses. It therefore effectively divides the difference frequency by a predetermined constant scale factor to provide start and stop gate pulses for the digital counter. The subtractors may be either digital devices or mixers having filtering means to allow only the difference frequency to pass from the output.

It can now be seen that:

$$N = d\ (F_o - F)/F - F\infty$$

where $N$ is the number registered in the counter, $d$ is the scale-factor of the time base scaler, $F_o$ is the frequency of REFERENCE OSCILLATOR 1, $F\infty$ is the frequency of REFERENCE OSCILLATOR 2, and $F$ is the frequency of the transducer. The outcome is that the numerator of this fraction varies as the frequency of the transducer and goes to zero at some chosen point. The denominator (the frequency by which the transducer is shifted from its free space frequency) is provided by application of this difference frequency to the time base of the counter.

Line 51 of the graph (FIG. 7) shows the final output of the digital counting unit (FIG. 4) resulting from the linearizing arrangement. At minimum separation, S1, the final output frequency is also at its minimum, F1, and increases to a maximum, F2, when the transducer is in free space. The solid portion of line 51 which lies between the dotted lines is the linearized portion of the output which may be adjusted to go to zero or to align with the actual contact-zero separation as shown by the dotted-line extension through the origin. By the proper selection of the transducer's frequency range and the tuning of the reference oscillators, the instrument can be made to read out directly in dimensional engineering units over a limited range.

I have found experimentally that $F\infty$ is best adjusted to an arbitrary value which is usually at a slightly lower frequency than the measured value. The measured value is apparently higher than the theoretical value because of unaccounted for eddy currents within the circuit itself. The $F_o$ reference (REFERENCE OSCILLATOR 1) is then adjusted to that value which causes the linearized portion of the response to go to zero when the spacing between the transducer and the surface is zero. The sensitivity of the instrument may be adjusted by selection of the scale factor of the time base scaler, and/or the selection of the transducer's total frequency deviation.

Figure 5:
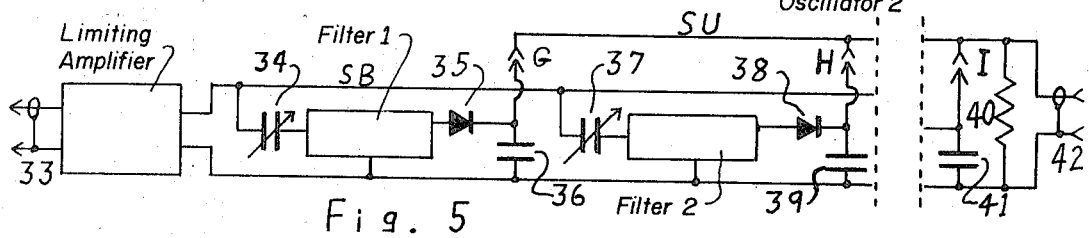
FIG. 5 illustrates an arrangement for producing a linearized analog output.

While the full capabilities of my invention are best realized by using it as a digital system, it is also capable of producing an output as an analog function of the measured dimension by substituting a different readout means. FIG. 5 shows one embodiment which converts the frequency-modulated signal to an analog output and performs a linearizing function.

The limiting amplifier is connected via the input, 33, to the signal output, 32, of the power supply module (shown in FIG. 2). From the limiting amplifier, signals of fixed amplitude but variable frequency are delivered to a series of frequency-selective detectors, only two of which are shown. In the first such detector, variable capacitor, 34, provides loose coupling from the signal bus, SB, to the selective filter, FILTER 1. Diode, 35, rectifies the output of FILTER 1 and charges capacitor, 36. The following selective filter, FILTER 2, operates in the same manner with capacitor, 37, acting as an adjustable coupling and capacitor, 39, acting as an integrator to store the peak voltage rectified by diode, 38. Subsequent stages ending with capacitor, 41, are similar and their number is determined by the characteristics desired.

Each of the detector stages is tuned to a different frequency and each acts as a resonance slop detector. When the outputs, G, H, through I are connected in parallel by the summing bus, SU, the total d-c level appears at the connector, 42. Depending on the value of the resistor, 40, the output voltage can be determined either by the total current output of the filters or the peak voltage of the one whose output is greatest. By tuning each filter to a given frequency and adjusting the coupling, the output is adjusted to whatever function is required. It is possible to reverse one or more of the diodes to further modify the output. The selective filters may be of a variety of types, both active and passive. Where a simple positive or negative going output is desired, a common frequency-modulation discriminator may be used.

Figure 6:
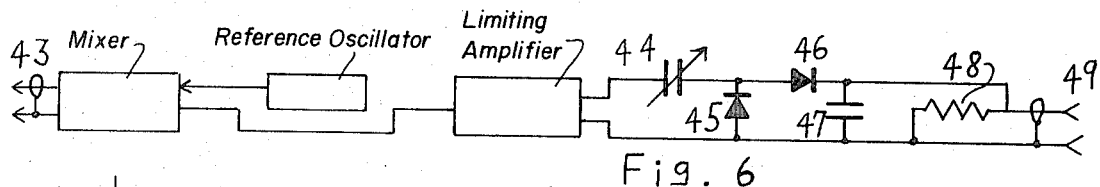
FIG. 6 shows another arrangement for producing a linearized analog output.

FIG. 6 is another embodiment of the invention. Connector, 43, is mated with the connector, 32, (FIG. 2) either directly or by cable. The reference oscillator is tuned to a preselected frequency, usually near that of the transducer's frequency when in free space. The mixer produces an output which is the difference frequency of the transducer and the reference oscillator. This difference frequency is processed by the limiting amplifier and appears across the capacitor, 44, and diode, 45, charging the capacitor. Capacitors 44, 47, and diodes 45, 46, act as a voltage doubler rectifier. The output appearing at the connector, 49, is limited by the charging current of capacitor 44 and loaded by resistor 48. As a conducting surface approaches the transducer, its frequency rises exponentially. At the same time, the signal output at connector 49 rises asymptotically as a function of the rising difference frequency because the charge on capacitor 47 is approaching its limit of twice the peak voltage output of the limiting amplifier. These two functions combine to produce an output that is linearized over a limited range of spacings between the transducer and the conducting surface.

I claim as my invention:

1. A system for making dimensional measurements by means of induced eddy-currents, comprising in combination a transducer comprising a sensing coil, at least one capacitor connected with said sensing coil forming a resonant circuit, at least one active component connected with said resonant circuit forming a variable oscillator whose frequency is determined by said resonant circuit and varied in response to the proximity of said sensing coil to an electrically conducting object; said transducer producing a frequency-varying output;

a first reference oscillator producing a first reference frequency approximately equal to the frequency of said frequency-varying output when said sensing coil is at its closest proximity to an electrically conducting object;

a first frequency subtracting means receiving said frequency-varying output and said first reference frequency, and producing therefrom a first difference frequency;

a second reference oscillator producing a second reference frequency approximately equal to the frequency of said frequency-varying output when said sensing coil is remote from any electrically conducting object;

a second frequency subtracting means receiving said frequency-varying output and said second reference frequency and producing therefrom a second difference frequency;

a scaler receiving said second difference frequency and producing therefrom an output frequency proportional thereto; and a digital counting means receiving the output frequency of said scaler and gating on in proportion to the period thereof; said digital counting means also receiving said first difference frequency and counting directly in proportion thereto.

2. The invention defined in claim 1, wherein said first reference oscillator is adjustable and said second reference oscillator is adjustable.

3. A system for making dimensional measurements by means of induced eddy-currents, comprising in combination a transducer comprising a sensing coil, at least one capacitor connected with said sensing coil forming a resonant circuit, at least one active component connected with said resonant circuit forming a variable oscillator whose frequency is determined by said resonant circuit and varied in response to the proximity of said sensing coil to an electrically conducting object; said transducer producing a frequency-varying output;

a limiting amplifier receiving said frequency-varying output and producing therefrom a similar frequency-varying signal of fixed amplitude;

a plurality of coupling means, each receiving said frequency-varying signal;

a plurality of frequency-selective filters, each connected to one of said coupling means and receiving a portion of said frequency-varying signal;

a plurality of amplitude detectors, each connected to one of said frequency selective filters, and a common bus connecting all of said amplitude detectors to a common output.

4. The invention defined in claim 2, wherein each of said coupling means is adjustable and each of said frequency-selective filters is adjustable.

* * * * *